United States Patent Office 2,730,459
Patented Jan. 10, 1956

2,730,459

PRESSURE-SENSITIVE ADHESIVE TAPE

Reynold E. Holmen, White Bear Township, Ramsey County, and William E. Lundquist, Savage, Minn., assignors to Minnesota Mining & Manufacturing Company, St. Paul, Minn., a corporation of Delaware No Drawing. Application June 19, 1952,
Serial No. 294,475

3 Claims. (Cl. 117—76)

This invention relates to pressure-sensitive adhesive tape, of the nature of masking tape, having a coating of pressure-sensitive tape adhesive firmly bonded to a thin flexible solvent-resistant backing member comprising a fibrous base impregnated and unified with an amide-ester polymer.

Full effectiveness in a commercially useful impregnating and unifying agent for fibrous tape backings requires a combination of a number of properties. The material is commonly applied from solution in a volatile solvent, for convenience in handling. The solution should be stable on storage. It should be of sufficiently high concentration so that an adequate amount of material is deposited in the porous fibrous base in a single treatment. The solution must be sufficiently fluid to penetrate and impregnate the fibrous web, and should not string out or form "cob-webs" when the saturated web is passed rapidly between rollers for controlling the coating weight. The impregnant must adhere strongly to the cellulosic or other fibers of the web so as to bond them together into a unified sheet which will not delaminate or "fuzz" when the adhesive tape product is stripped away from the roll or from surfaces to which temporarily adhesively applied. The impregnant must be film-forming, and the film should be solvent-resistant in order to prevent attack and penetration by solvents, plasticizers and color components of paints and lacquers. Hence the impregnant should be susceptible of curing from the soluble to the solvent-resistant state after incorporation in the web, and under conditions which do not degrade or damage the fibrous base material.

These and other advantageous properties and characteristics are obtained, in accordance with the present invention, by employing as the impregnating and unifying material a stable liquid composition consisting essentially of an amide-ester polymer and a small proportion of an aldehydic curing agent. The amide-ester polymer is formed by reacting together substantially equimolar proportions of dicarboxylic acids and of polyglycols and amino alcohols. As the dicarboxylic acids there are employed terephthalic or isophthalic acid, or mixtures of the two. The polyglycols and amino alcohols are reactive with the dicarboxylic acids, and are so selected and proportioned as to provide an average of about 3–12, or preferably 4–9, ether linkages, and also one amido group having a single hydrogen atom attached to the nitrogen atom, for approximately each 25–90 atoms, or preferably 35–65 atoms, in the skeletal chain. These relationships will now be more fully set forth by means of specific but non-limitative examples.

Example 1

| | Parts by weight | mols |
|---|---|---|
| Terephthalic acid | 41.5 | 2.5 |
| Polyethylene glycol | 60 | 3.0 |
| Monoethanolamine | 6.2 | 1.0 |

Sodium bisulfate in the amount of 0.1 part by weight was added as a catalyst. Other esterification catalysts, e. g. sulfuric acid, may be substituted. The catalyst may be added at the start of the heating process, or, preferably, after the reaction has proceeded somewhat. Such catalysts reduce the time needed to complete the reaction, but are not essential and may be omitted.

The mixture was placed in a still fitted with a condenser, and heated for 4½ hours at 165° C. and 7½ hours at 165–258° C. The system was then evacuated and heating continued for 8 hours at 210–234° C. and 3 mm. of pressure, and 3 hours at 265° C. and 3 mm. During the heating under vacuum, there was recovered approximately one-half of the initial amount of polyethylene glycol. The acid number of the polymeric product was 1.7. The product was soluble in mixtures of isopropanol and xylol, forming a smooth, fluid solution at concentrations of the order of 60%.

To the polymer solution there was added a quantity of a soluble, heat-reactive melamine-formaldehyde resin ("Melmac 248-8") to the extent of 4% by weight of the weight of the dry polymer. This solution was spread in a thin film on an amalgamated tin panel, dried, and cured by heating for 4 hours at 100° C. The film was stripped from the panel and tested for tensile strength and elongation, using a Scott inclined plane serigraph testing instrument and operating at normal room temperature and under conditions such that 10% elongation was obtained in from one to 4 seconds. The modulus of the film at 100% elongation was 40 lbs./sq. in. and the tensile strength at break was 102 lbs./sq. in. at 655% elongation.

The polyethylene glycol had an average molecular weight of approximately 200, and was a commercially available mixture of polyethylene glycols. It was added in substantial excess in order to dissolve the terephthalic acid and provide a homogeneous system for reaction, the excess being subsequently removed by vacuum distillation.

Porous creped saturating-paper (27 lbs. "Duracell" crepe) was impregnated with the solution of polymer and aldehydic curing agent as above described, to the extent of 14.5 grains of the solvent-free mixture per 24 sq. in. of the paper. After drying, the sheet was heated for 30 minutes in an oven at a temperature of 250° F. The resulting web was completely non-porous to air when tested in a Gurley densometer. It was then given an additional light surface coating of a conventional low-adhesion-backsize composition, in this case a mixture of three parts of soluble heat-advancing urea-formaldehyde resin ("Uformite F-200–E") and approximately one part of a non-oxidizing castor oil alkyd resin plasticizer ("Paraplex AL-16"), applied from solution in xylol and butanol, and again heated, this time for about 10 minutes at 250° F. The other surface of the sheet was next coated with an adhesive primer solution consisting essentially of rubber latex and alkali caseinate, and a further coating of a rubber-resin type pressure-sensitive adhesive.

The resulting adhesive-coated sheet material was slit into narrow widths and wound up in roll form, and provided a highly satisfactory example of pressure-sensitive adhesive masking tape. The tape was flexible and strong, and could be temporarily adhered to curved surfaces and along curved lines, and subsequently stripped away, without difficulty from tearing or delamination. When placed on lacquered panels and sprayed with lacquer of contrasting color, the tape was found to provide complete protection of the underlying surface.

Example 2

Isophthalic acid in equal amount was substituted for the terephthalic acid in Example 1, and the reaction carried forward substantially as there described. (Mixtures of isophthalic and terephthalic acids in any proportion are equally useful.) The resulting polymer was substantially identical in properties with that of Example 1. It cured to a rubbery film when heated with about 2–6% of melamine-formaldehyde resin as described under Example 1. In both examples, the rate of cure could be increased by the addition of small amounts of acidic catalysts such as oxalic acid.

The polymer was equally as effective as that of the previous example in providing a unified fibrous backing for pressure-sensitive adhesive tape when combined with a small proportion of an aldehydic curing agent as there described.

Example 3

| | Parts by weight |
|---|---|
| Terephthalic acid | 41.5 |
| Polyethylene glycol | 60 |
| Monoethanolamine | 3.1 |

As in Example 1, the reactants were heated in the presence of 0.1 part of sodium bisulfate, the conditions being 25 hours at 185–195° C., 7 hours at 198° C., and 25 hours at 230–255° C. and 2–4 mm. pressure. The excess of polyethylene glycol was distilled off during the heating under vacuum. The product when cured by heating with a small amount of melamine-formaldehyde curing agent gave a weakly elastic film.

The mixture of polymer and aldehydic curing agent, when employed as an impregnant for saturating-paper, provided a solvent-resistant sheet material having a lower tensile strength than that of Example 1 but still useful as an adhesive tape backing for many purposes.

The proportion of monoalkanolamine in Example 3 will be seen to be only one-half as great as the proportion employed in Examples 1 and 2. The amount used provides an average of one reactive hydrogen atom—i. e. one amide linkage—for approximately each 90 atoms in the skeletal chain of the polymer, and represents an approximate lower limit of frequency where the resulting polymer is required to be curable to an elastic, solvent-resistant film. At frequencies greater than about one amide linkage per 25 atoms in the skeletal chain, polymers are obtained which are undesirably stiff and inelastic for many purposes.

Polymerization may be carried out in the presence of a water-immiscible volatile liquid such as xylol, water of condensation being removed during the reaction.

The polyethylene glycol of an average molecular weight of about 200 is preferred, but other glycols having greater or lesser molecular weight may be substituted in whole or in part, provided they have an average of at least two ether linkages in the molecule. The use of an initial excess of this material provides an effective means of placing the difficultly soluble acidic component in solution, and also reduces the reaction time necessary to provide a product having a low acid number. However, any such excess must obviously be of a material sufficiently low in molecular weight as to permit its subsequent removal under ester interchange and vacuum distillation.

The monoethanolamine provides a primary amino group which, when reacted with a carboxyl radical, forms in the polymer chain an amido group having a reactive hydrogen atom and providing a point of reactivity with an active methylol group of the melamine-formaldehyde resin. Non-cyclizable primary amino monoalkanolamines in general may be substituted for the monoethanolamine within the limitations as to the required frequency of amide linkages along the polymeric skeleton, with the limitation that the nitrogen atom must be attached to a non-tertiary—i. e. primary or secondary—carbon atom. Included within the class of useful monoalkanolamines are n-propanolamine, iso-propanolamine, n-butanolamine, n-decanolamine, 2-amino-1-pentanol, 3-amino-4-heptanol, 2-amino-4-pentanol.

Minor amounts of other difunctional reactants such as diamines, N-substituted alkanolamines, unsaturated dicarboxylic acids, etc. may be introduced as modifiers provided they do not substantially alter the average frequency of the reactive hydrogen atoms along the polymer chain.

Methylol-containing melamine-formaldehyde resins have been found to impart a high degree of strength to these amide-ester polymers when used in small amounts of the order of 2–6% as curing agents. Other amino-aldehyde resins as well as phenolaldehyde resins containing free methylol groups, as well as aldehydes such as formaldehyde and glyoxal, are likewise effective as curing agents for these polymers. The cured polymer is highly solvent-resistant, tough and rubbery. When cured by heating in contact with cellulosic and other analogous surfaces to which initially adhered, the product retains its strong bond to such surfaces. As an impregnating and unifying agent for porous saturating-paper or other fibrous sheet material, the cured polymer provides a solvent- and oil-resistant sheet of superior flexibility and strength, and which is particularly applicable as the backing member of pressure-sensitive adhesive tape.

What is claimed is as follows:

1. Solvent-resistant pressure-sensitive adhesive tape having a coating of pressure-sensitive adhesive firmly adherently bonded to a unified fibrous backing comprising a thin porous fibrous sheet material impregnated and unified with a solvent-resistant, rubbery, heat-reacted mixture of an amide-ester polymer and a small amount of an aldehydic curing agent, said polymer being obtained by heating together, at a high temperature, substantially equimolar proportions of components comprising essentially (a) dicarboxylic acids from the class consisting of terephthalic and isophthalic acid, and (b) combinations of a plurality of polyglycols having an average of at least two ether linkages and at least one non-cyclizable primary amino monoalkanolamine having a non-tertiary carbon atom attached to the nitrogen atom; the polyglycols and monoalkanolamines being so selected and proportioned as to provide an average of about 3–12 ether linkages, and one amido group having a single hydrogen atom attached to the nitrogen atom, for approximately each 25–90 atoms in the skeletal polymer chain.

2. Solvent-resistant pressure-sensitive adhesive tape having a coating of pressure-sensitive adhesive firmly adherent bonded to a unified fibrous backing comprising a thin porous fibrous sheet material impregnated and unified with a solvent-resistant, rubbery, heat-reacted mixture of an amide-ester polymer and a small amount of an aldehydic curing agent, said polymer being obtained by heating together, at a high temperature, substantially equimolar proportions of components comprising essentially (a) dicarboxylic acids from the class consisting of terephthalic and isophthalic acid, and (b) combinations of a plurality of polyglycols having an average of at least two ether linkages and at least one non-cyclizable primary amino monoalkanolamine having a non-tertiary carbon atom attached to the nitrogen atom; the polyglycols and monoalkanolamines being so selected and proportioned as to provide an average of about 4–9 ether linkages, and one amido group having a single hydrogen atom attached to the nitrogen atom, for approximately each 35–65 atoms in the skeletal polymer chain.

3. Solvent-resistant pressure-sensitive adhesive tape having a coating of pressure-sensitive adhesive firmly adherently bonded to a unified fibrous backing comprising a thin porous fibrous sheet material impregnated and unified with a solvent-resistant, rubbery, heat reacted mixture of 100 parts by weight of an amide-ester polymer soluble in isopropanol-xylol and containing amido groups in the polymer chain, and about 2–6 parts by weight of a soluble, heat-reactive, amino-aldehyde resinous curing agent; said amide-ester polymer being the low-acid-number heat-reaction product of substantially equimolar proportions of components comprising essentially (a) dicarboxylic acids from the class consisting of terephthalic and isophthalic acid, and (b) combinations of a plurality of polyglycols having an average of at least two ether linkages and at least one non-cyclizable primary amino monoalkanolamine having a non-tertiary carbon atom attached to the nitrogen atom; the polyglycols and monoalkanolamines being so selected and proportioned as to provide an average of about 3–12 ether linkages, and one amido group having a single hydrogen atom attached to the nitrogen atom, for approximately each 25–90 atoms in the skeletal polymer chain.

References Cited in the file of this patent

UNITED STATES PATENTS

| | | |
|---|---|---|
| 1,780,375 | Bradley | Nov. 4, 1930 |
| 2,106,523 | Ellis | Jan. 25, 1938 |
| 2,341,735 | Monsaroff | Feb. 15, 1944 |
| 2,445,553 | Beaver | July 20, 1948 |
| 2,484,416 | Martin | Oct. 11, 1949 |
| 2,576,045 | Robinson et al. | Nov. 20, 1951 |